July 7, 1936.  W. M. SMITH ET AL  2,046,416
MERCURY COLUMN THERMOSTAT
Filed Jan. 26, 1935
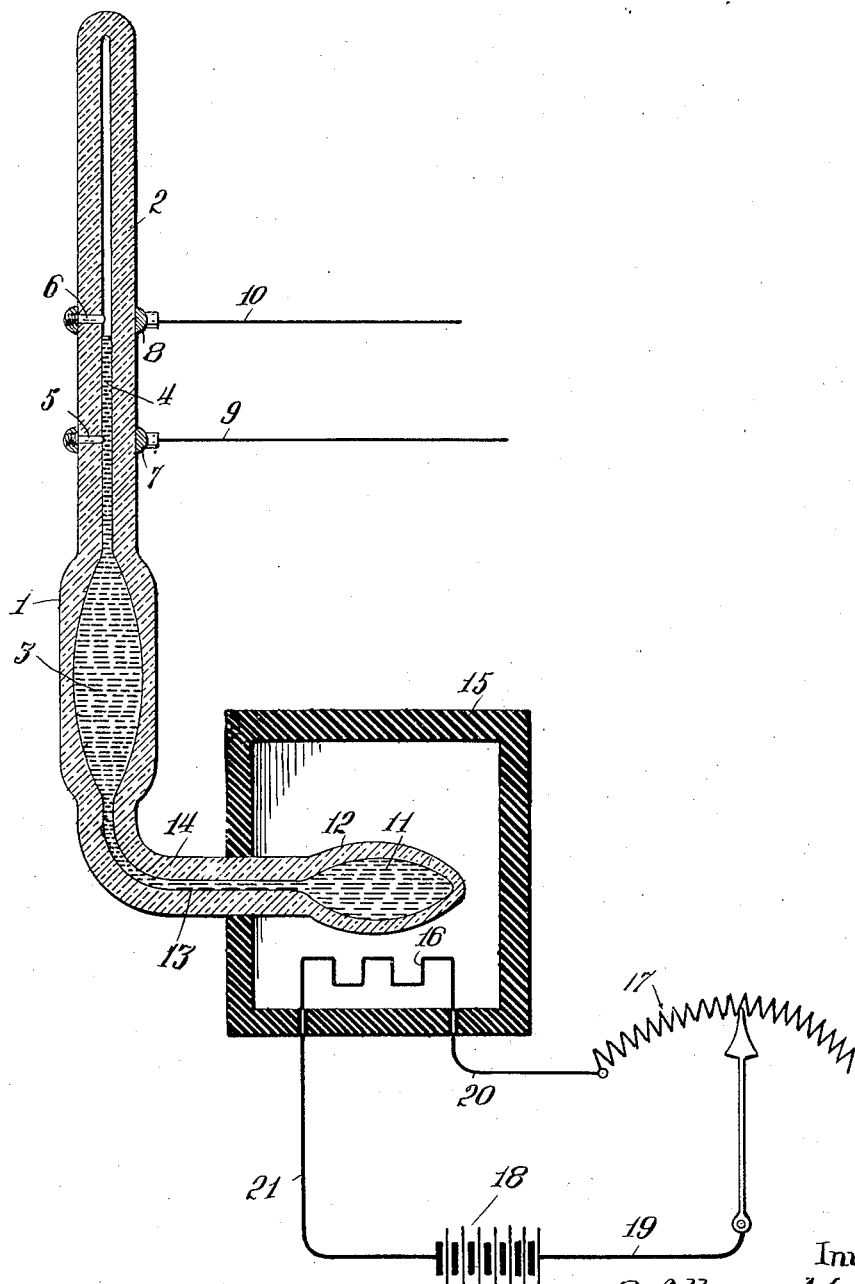
Inventors
William M. Smith
and Donald W. Miller
By Barnett Truman
Attorneys Patented July 7, 1936

2,046,416

UNITED STATES PATENT OFFICE 2,046,416

MERCURY COLUMN THERMOSTAT

William M. Smith, Chicago, and Donald W. Miller, Elmhurst, Ill., assignors to Vapor Car Heating Company, Inc., Chicago, Ill., a corporation of New York Application January 26, 1935, Serial No. 3,576

4 Claims. (Cl. 200—122)

This invention relates to certain new and useful improvements in thermostats of the mercury column type, more particularly to an improved means for changing or adjusting the temperature or temperatures at which the thermostat will function.

The well-known mercury column thermostat resembles an ordinary mercury thermometer with electric contacts so positioned in the path of the mercury column that a circuit through a portion of this mercury column will be completed or broken as the temperature reaches or falls below a certain predetermined temperature at which the device is designed to function. In order to change or adjust the temperature at which the thermostat will function it has been proposed to add or subtract heat from the vicinity of the thermostat bulb, that is apply a substantially constant correction. This idea is disclosed and claimed in the patent to Parks 1,760,081, granted May 27, 1930. The accuracy of this method of adjustment is affected by changes in the air currents flowing in the vicinity of the thermostat bulb and the heating or cooling means. The effect of the heater will be dissipated or reduced to some extent by a strong air current tending to carry away the heated air before it transfers heat to the thermostat.

According to the present invention the mercury reservoir is divided between two connected bulbs, one bulb being exposed to the atmosphere and functioning in the usual manner in response to changes in atmospheric temperature, and the other bulb being enclosed in a protective covering or housing in which is also positioned the heater or other device for effecting the temperature correction. The effect of air currents or other disturbing elements is thus eliminated or reduced.

The principal object of this invention is to provide an improved thermostat such as briefly described hereinabove and disclosed more in detail in the specifications which follow.

Another object is to provide an improved adjusting device for a mercury column thermostat.

Other objects and advantages of this invention will be more apparent from the following detailed description of one approved form of thermostat constructed and operating according to this invention.

The accompanying drawing is a rather diagrammatic vertical section through the thermostat and cooperating electric features.

The main glass bulb 1 and upwardly extending stem 2 confine a volume of mercury 3, some of which extends up as a fine column 4 within the hollow stem 2. Due to the fact that mercury expands more rapidly than glass when heated, when the temperature rises the mercury column 4 will extend further up within stem 2, and conversely as the temperature falls the mercury column will descend. A pair of similiar fixed electric contacts 5 and 6 are cast into the glass stem 2 so as to make contact with the mercury column 4. In the form here shown, the contacts 5 and 6 are connected with similar metallic rings 7 and 8 clamped about the stem 2, and circuit wires 9 and 10, respectively, are secured to these rings. The contact 5 is preferably so positioned that the mercury column 4 will always engage therewith. This lower contact could, in fact, be connected with any portion of the mercury within the thermostat, but it is preferable not to space this contact too far from the contact 6, thus decreasing the resistance in the circuit. When the temperature rises so that mercury column 4 engages the upper contact 6, a circuit will be completed between wires 9 and 10, this circuit usually operating some temperature-regulating or controlling mechanism. When the temperature adjacent the thermostat falls below the predetermined temperature for which contact 6 is positioned, this circuit will be broken by the mercury column 4 dropping below the level of contact 6. This type of thermostat, as thus far described, is well known.

In the present improved form of thermostat, the reservoir of mercury is divided between the volume 3 in the main bulb 1 and an additional volume 11 in the auxiliary bulb 12, these two volumes of mercury being connected through passage 13 in the hollow stem 14. The main bulb 1 is exposed to the atmosphere in the usual manner, but the auxiliary bulb 12 is enclosed in a housing or casing 15. This housing 15 may be of any convenient size or shape, and as far as the function of shutting off air currents is concerned may be constructed of any suitable material. It is preferable, however, to form the casing of a heat-insulating material. Within this housing and in proximity to the auxiliary bulb is positioned an electric heating coil 16, and at 17 is indicated an adjustable rheostat connected in circuit with the heating coil and a source of power 18 through wires 19, 20 and 21. By suitably adjusting the rheostat 17, the current flowing through coil 16 and hence the volume of heat given out by this coil can be regulated.

As the volume of mercury 11 in auxiliary bulb 12 is heated and expands, some of this mercury will be forced out through passage 13 into the main bulb 1, thus displacing a portion of the mercury 3 in this bulb so as to elevate the mercury column 4. This will be a substantially constant correction, the actual height of mercury column 4 varying with changes in the atmospheric temperature in the vicinity of the thermostat.

While the electric heating means hereinabove disclosed is preferred and is the most convenient, other types of heating or cooling means could be used within the housing 15.

To illustrate the purpose of this invention, let us assume that the thermostat is constructed so as to normally function at 74° F. In other words, if the atmospheric temperature rises to 74° F. the mercury column 4 will rise sufficiently to engage the fixed contact 6 and complete the circuit between wires 9 and 10. If it is desired to complete this circuit, or a similar circuit at some other temperature, such as 72° F., it is ordinarily necessary to provide another similar thermostat with the fixed contact 6 positioned at a different level, or with a change in the volume of mercury or some other feature of design of the instrument. It has also been suggested to provide additional contacts spaced at intervals in the stem 2 with separate circuit wires extending to the different contacts. According to the present invention, the rheostat 17 would be so adjusted that the heating element 16 would raise the temperature of the mercury just sufficient to elevate the mercury column 4 through a distance corresponding to 2° F. Therefore if the atmospheric temperature reaches 72° F., the mercury column would actually be elevated 2 more degrees as a result of the correction applied to the auxiliary bulb 12 and the instrument would function as before, that is, contact would be made between the mercury column and fixed contact 6, although the actual atmospheric temperature is only 72° F. In a similar manner, a single instrument of this type can be so adjusted as to function at a variety of different selected temperatures. Since the auxiliary bulb 12 and correcting means 16 are enclosed and insulated, they will not be influenced by varying air currents or other disturbing influences and the applied correction will be substantially constant.

We claim:

1. An adjustable mercury column thermostat adapted to respond to the temperature of an air stream contacting therewith, said thermostat comprising a main bulb, an auxiliary bulb adjacent thereto, an upwardly extending tube, said bulbs and tube being in communication with one another and housing a closed space sealed from the outer air, a quantity of mercury filling the space within the bulbs and extending to a varying height within the tube, a pair of spaced apart electric contacts one of which is in normally constant engagement with the mercury and the other being positioned in the tube so as to be engaged by the mercury when the thermostat is subjected to a predetermined temperature, means positioned adjacent the auxiliary bulb for applying a substantially constant but adjustable heat correction thereto, and a protective housing enclosing the last mentioned means and auxiliary bulb to prevent contact of the air stream therewith, the main bulb remaining exposed to the air stream.

2. An adjustable mercury column thermostat adapted to respond to the temperature of an air stream contacting therewith, said thermostat comprising a main bulb, an auxiliary bulb adjacent thereto, an upwardly extending tube, said bulbs and tube being in communication with one another and housing a closed space sealed from the outer air, a quantity of mercury filling the space within the bulbs and extending to a varying height within the tube, a pair of spaced apart electric contacts one of which is in normally constant engagement with the mercury and the other being positioned in the tube so as to be engaged by the mercury when the thermostat is subjected to a predetermined temperature, an electric heating coil positioned adjacent the auxiliary bulb, means for providing a current of predetermined strength in the coil, and a protective housing enclosing the coil and auxiliary bulb to prevent contact of the air stream therewith, the main bulb remaining exposed to the air stream.

3. An adjustable mercury column thermostat adapted to respond to the temperature of an air stream contacting therewith, said thermostat comprising a main bulb, an auxiliary bulb adjacent thereto, an upwardly extending tube, said bulbs and tube being in communication with one another and housing a closed space sealed from the outer air, a quantity of mercury filling the space within the bulbs and extending to a varying height within the tube, a pair of spaced apart electric contacts one of which is in normally constant engagement with the mercury and the other being positioned in the tube so as to be engaged by the mercury when the thermostat is subjected to a predetermined temperature, a heat-insulated housing enclosing the auxiliary bulb, the main bulb remaining exposed to the air stream, and means within the housing for applying a substantially constant but adjustable heat correction to the auxiliary bulb.

4. An adjustable mercury column thermostat adapted to respond to the temperature of an air stream contacting therewith, said thermostat comprising a main bulb, an auxiliary bulb adjacent thereto, an upwardly extending tube, said bulbs and tube being in communication with one another and housing a closed space sealed from the outer air, a quantity of mercury filling the space within the bulbs and extending to a varying height within the tube, a pair of spaced apart electric contacts one of which is in normally constant engagement with the mercury and the other being positioned in the tube so as to be engaged by the mercury when the thermostat is subjected to a predetermined temperature, a heat-insulated housing enclosing the auxiliary bulb, the main bulb remaining exposed to the air stream, an electric heating coil within the housing, and means for providing a current of predetermined strength in the coil and thereby determining the heating effect of the coil.

WILLIAM M. SMITH.
DONALD W. MILLER.